Patented July 13, 1948

2,445,283

UNITED STATES PATENT OFFICE 2,445,283

CURING OLEFIN-DIOLEFIN COPOLYMERS

Robert R. Sterrett, Naugatuck, Conn., assignor to United States Rubber Company, New York, N. Y., a corporation of New Jersey No Drawing. Application January 15, 1944, Serial No. 518,415

1 Claim. (Cl. 260—79)

This invention relates to improvements in curing butyl rubber, which is considered to be a copolymer of a mono-olefine and a diolefine, for example, a copolymer of a major proportion of isobutylene and a minor proportion of a diolefine copolymerizable therewith, such as isoprene, butadiene-1,3, etc. See British Patent No. 523,248, and Industrial and Engineering Chemistry, 32, pages 1283 et seq. (1940).

It is known that quinone dioximino compounds which include such as para-quinone dioxime as well as certain derivatives such as the esters, e. g., para-quinone dioxime dibenzoate, etc., in the presence of selected inorganic and/or organic oxidizing agents, vulcanize the synthetic rubber known as butyl rubber. The vulcanization is quite rapid, and in many instances it results in scorched stocks which causes waste and delay.

Scorch is defined as a premature partial vulcanization of the stock brought about by heat present or developed during processing. A scorched stock is no longer completely thermoplastic and cannot be smoothly sheeted or extruded. Scorch life, as determined by the Mooney plastometer, is a measure of the time during which the stock may be safely processed. The exact time will depend largely on processing temperature and to some extent on the processing operation being carried out. A Mooney scorch resistance (defined below) of ten minutes at 250° F. is considered satisfactory for factory processing of Hevea rubber tread stocks under ideal conditions. A longer time is desirable to provide a factor of safety.

I have found that by adding a thiuramdisulfide having the structure

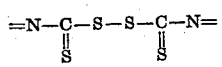

in which the terminal nitrogen is bonded to aliphatic hydrocarbon radicals such of alkyl or cycloalkyl (e. g., ethyl, butyl, amyl, cyclo-pentamethylene, benzyl, etc.), and particularly a tetra-alkyl thiuramdisulfide, to a butyl rubber mix which is to be vulcanized with a member of the above referred to quinone dioximino class of non-sulfur vulcanizing agents, that the rate of cure can be greatly reduced and scorching prevented. Based on 100 parts, by weight, of the butyl rubber the amount of the disulfide is proportioned, according to the amount of the said vulcanizing agent used, to be in amount sufficient to properly set the stock with substantially no scorching. Generally, the amounts used may range from .01 to about 4 parts of the disulfide per 100 parts of the rubber, although in certain cases more may be used.

The following examples, in which the parts are by weight, illustrate the invention, it being understood that the invention is not to be limited thereto:

Example 1

| | A | B |
|---|---|---|
| Butyl rubber | 100.0 | 100.0 |
| Carbon black | 60.0 | 60.0 |
| Stearic acid | 3.0 | 3.0 |
| Sulfur | 1.5 | 1.5 |
| Zinc oxide | 5.0 | 5.0 |
| PbO$_2$ | 6.0 | 6.0 |
| Para-quinone dioxime | 2.0 | 2.0 |
| Tetromethyl thiuramdisulfide | | 2.0 |

In milling the above mixes, A set up on the mill, while B mixed normally. The temperature of the mix did not exceed 210° F.

Example 2

| | C | D |
|---|---|---|
| Butyl rubber | 100.0 | 100.0 |
| Carbon black | 60.0 | 60.0 |
| Stearic acid | 3.0 | 3.0 |
| Sulfur | 1.5 | 1.5 |
| Zinc oxide | 5.0 | 5.0 |
| Pb$_3$O$_4$ | 10.0 | 10.0 |
| Para-quinone dioxime | 2.0 | 2.0 |
| Tetramethyl thiuramdisulfide | | 0.5 |

Mooney Plastometer Scorch Resistance at 250° F.*

1 minute    4 minutes

Note the increased time necessary to set up stock D.

*Time at which the rate of increase of the Mooney viscosity reaches a value of two units per minute at 250° F.

While I have shown various embodiments of the invention, it is to be understood that the invention is susceptible of those modifications which appear within the spirit of the invention and the scope of the appended claims, for example, other substituted thiuramdisulfides than the tetra-substituted materials may be used, e. g., the disubstituted thiuramdisulfides such as dibenzyl thiuramdisulfide.

Having thus described my invention, what I claim and desire to protect by Letters Patent is:

A method of reducing the rate of cure of a rubbery copolymer of a major proportion of a mono-iso-olefin and a minor proportion of a conjugated diolefin vulcanized with an oxidizing agent and p-quinone dioxime, which comprises additionally adding to the stock before cure a small amount of tetramethyl thiuramdisulfide.

ROBERT R. STERRETT.

REFERENCES CITED

The following references are of record in the file of this patent:

UNITED STATES PATENTS

| Number | Name | Date |
|---|---|---|
| 2,311,004 | Thomas et al. | Feb. 16, 1943 |
| 2,391,742 | Roberts | Dec. 25, 1945 |